(12) United States Patent
Pan et al.

(10) Patent No.: US 6,181,851 B1
(45) Date of Patent: Jan. 30, 2001

(54) TEMPERATURE-COMPENSATED OPTICAL FIBER PACKAGE

(75) Inventors: Jing-Jong Pan, Milpitas; Jian Chen; Pan Ma, both of San Jose, all of CA (US)

(73) Assignee: E-Tek Dynamics, Inc., San Jose, CA (US)

(*) Notice: Under 35 U.S.C. 154(b), the term of this patent shall be extended for 0 days.

(21) Appl. No.: 09/071,636

(22) Filed: May 1, 1998

Related U.S. Application Data

(60) Provisional application No. 60/047,937, filed on May 29, 1997.

(51) Int. Cl.[7] .................................................. G02B 6/24
(52) U.S. Cl. ............................. 385/37; 385/31; 385/15
(58) Field of Search ............................ 385/37, 31, 15; 359/566

(56) References Cited

U.S. PATENT DOCUMENTS

| | | | |
|---|---|---|---|
| 5,042,898 | 8/1991 | Morey et al. | 385/37 |
| 5,367,589 | 11/1994 | MacDonald et al. | 385/37 |
| 5,841,920 | * 11/1998 | Lemaire et al. | 385/37 |
| 5,920,663 | * 7/1999 | Dragone | 385/15 |
| 5,978,539 | * 11/1999 | Davies et al. | 385/129 |

OTHER PUBLICATIONS

Hammon, T.E. et al., "A Temperature Compensated Optical Fibre Bragg Grating Band Rejection Filter and Wavelength Reference," First Optoelectronics and Communications Conference (OECC), Technical Digest, pp. 350–351, Jul., 1996, Makuhari Masse, Japan.

Weidman, G.G. et al., "A Novel Negative Expansion Substrate Material for Athermalizing Fiber Bragg Grating," 22nd European Conference on Optical Communication (ECOC), MoB. 3.5:61–64, Sep., 1996, Oslo, Norway.

Yoffe, G.W. et al., "Passive Temperature–Compensating Package for Optical Fiber Gratings," *Applied Optics*, Oct. 20, 1995, vol. 34, No. 30, pp. 6859–6861.

Yoffe, G.W. et al., "Temperature–Compensated Optical–Fiber Bragg Gratings," OFC '95 Technical Digest, pp. 134–135.

* cited by examiner

*Primary Examiner*—Hemang Sanghavi
*Assistant Examiner*—Ellen E. Kim
(74) *Attorney, Agent, or Firm*—Townsend Townsend & Crew LLP; Mark D. Barrish, Esq.

(57) ABSTRACT

The invention provides a package which varies the tension within a fiber Bragg grating (or other fiber-based optical device) by resilient deflection of a fiber support member through differential thermal expansion, thereby allowing the temperature/tension characteristics of the package to be tailored so as to provide the desired optical characteristics throughout a wide temperature range. The fiber tension/temperature correlation may be tailored using the linear coefficient of expansion of two different materials, by varying the resilient flexibility of a beam supporting the fiber, by varying a length of an arm extending from the beam to the fiber, by varying the resilient strength of the arm, and the like. By relying on the resilient deformation of a flexible fiber support structure, the present invention provides a large number of degrees of freedom within the package design parameters. Where such precise control over the temperature/tension correlation is not required, the invention provides alternative compensation packages which can be mass-produced easily.

13 Claims, 6 Drawing Sheets

TEMPERATURE-COMPENSATED OPTICAL FIBER PACKAGE

This application claims the benefit of U.S. Provisional No. 60/047,937 filed May 29, 1997.

BACKGROUND OF THE INVENTION

The present invention is related to the field of fiberoptic devices and networks, and more particularly, provides optical fiber packages which vary tension in an optical fiber, particularly for compensating for temperature induced wavelength variations in fiber Bragg gratings.

Modern fiberoptic communication systems often have the ability to simultaneously transfer light signals having differing wavelengths over a single optical fiber.

Fiber Bragg gratings are a particularly advantageous structure for differentiating and manipulating optical signals based on their wavelength. Fiber Bragg gratings are often formed by selectively exposing photosensitive fiber to light, thereby creating a permanent refractive-index grating along the core of the fiber. Sharp reflection resonances can be used as demultiplexers, laser diode wavelength stabilizers, external laser mirrors, dispersion compensators, and the like. Fiber Bragg gratings also have applications in communications and sensor areas, operating as resonators, filters, pressure sensing elements, etc. Therefore, fiber Bragg gratings are expected to be important components in many optical communication systems, particularly in the dense wavelength division multiplex systems now being developed.

Unfortunately, fiber Bragg gratings often have a significant temperature sensitivity. For example, the resonant wavelength of a fiber Bragg grating may vary as much as 0.01 nm per degree centigrade. This temperature sensitivity is significantly higher than the sensitivity of resonators and/or filters formed using thin-film coating techniques, which typically provide resonant frequencies which vary about 0.003 nm per degree centigrade. Their large temperature sensitivity mitigates the cost advantages and precise wavelength control otherwise provided by fiber Bragg gratings, thereby limiting their acceptability.

To overcome the disadvantageous sensitivity of fiber Bragg gratings to changes in temperature, a variety of temperature compensation packages have been proposed. Known compensation packages generally rely on fiber support structures having one or more materials which are affixed to the fiber so as to compensate for the thermal expansion of the fiber material. Unfortunately, to overcome the disadvantageous increase in length of the fiber Bragg grating, these known compensation packages generally requires identification of a material (or combination of materials) which provides an exactly compensating effective thermal coefficient of expansion throughout the entire wavelength range.

Although known temperature compensation packages have decreased the sensitivity of the packaged fiber Bragg grating, these known structures suffer from certain disadvantages. For example, these known structures are often difficult to mass produce, and also tend to retain a significant amount of temperature sensitivity. While the remaining temperature sensitivity variation of known compensated fiber Bragg gratings is acceptable for some uses, it may be unacceptable for use in some dense wave division multiplex systems.

SUMMARY OF THE INVENTION

The present invention substantially mitigates or overcomes the above disadvantages, generally by providing additional mechanisms for varying the tension within a fiber Bragg grating or other fiber-based optical device. In some embodiments, the fiber tension/temperature correlation may be tailored using not only the linear coefficient of expansion of two different materials, but also by varying the resilient flexibility of a yieldable member supporting the fiber. In the exemplary embodiment, the temperature/tension correlation may be established during the package design process by varying a length of an arm extending from the beam to the fiber, by varying the resilient strength of the arm, and the like, thereby allowing the temperature compensation characteristics of the package to be tailored so as to provide the desired optical characteristics throughout a wide temperature range. By relying on the resilient deformation of a flexible fiber support member, the present invention provides a much greater number of degrees of freedom within the temperature compensation design parameters. This provides temperature compensated packages which precisely compensate for changes in wavelengths of fiber Bragg gratings with significantly greater precision than known temperature compensation packages. Where such precise control over the temperature/tension correlation is not required, the present invention provides alternative compensation packages which can be mass-produced at significantly lower cost than known package structures.

In a first aspect, the present invention provides a temperature-adjusting optical fiber package comprising a first member having a first thermal coefficient of expansion. A second member has a second thermal coefficient of expansion which is different than the first coefficient. The second member is coupled to the first member to impose a resilient deflection in the first member which varies with temperature. An optical fiber is supported by the first member, and has an optical characteristic which varies with tension. The first member supports the fiber under a tension which varies with the resilient deflection of the first member.

In another aspect, the invention provides a temperature compensated optical fiber package comprising a first member having a first thermal coefficient of expansion, a first end, a second end, and an axis between the first end and the second end. A second member is affixed axially along the first member. The second member has a second thermal coefficient of expansion which is different than the first coefficient so that a resilient lateral deflection of the first and second members varies in response to a temperature of the package. An optical fiber has an optical characteristic which varies with temperature and with tension. The fiber is attached to the first and second ends of the first member by first and second attachment structures, respectively. The attachment structures impose a tension on the fiber which varies in response to the lateral deflection of the first and second members, so that the tension compensates for temperature-induced variations in the optical characteristic.

In yet another aspect, the present invention provides a temperature compensated fiber Bragg grating package, the package comprising a first member comprising a first material and having a first thermal coefficient of expansion. A second member engages the first member, and comprises a second material having a second thermal coefficient of expansion. An optical fiber has a Bragg grating with a resonant frequency which varies with temperature when the fiber is at rest. The fiber is coupled to the members so that the members impose a varying tension in the fiber while a temperature of the package changes within a range of between about −20 and 80 degrees centigrade. The varying tension is tailored throughout the temperature range to compensate for temperature induced resonant frequency variations of the Bragg grating, so that the resonant frequency of the packaged Bragg grating remains within a range of about 0.001 nm throughout the temperature range.

In yet another aspect, the present invention provides a temperature compensated fiber package comprising a member having a first end, a second end, and a channel which extends therebetween. The channel is open laterally, and the member comprises a material having a negative thermal coefficient of expansion. A fiber with an optical characteristic which varies with both temperature and tension is disposed within the laterally open channel of the member. The fiber is attached adjacent to the first and second ends of the member by first and second attachment structures, respectively. The member imposes a tension on the fiber which increases with decreasing temperature to compensate for temperature induced variation in the optical characteristic.

In a method provided by the invention, a tension is imposed on an optical fiber with a resilient member. The optical fiber has an optical characteristic which varies with temperature. A resilient deflection of the member is varied by differently thermally expanding the member relative to another structure. This varies the tension in the fiber with a predetermined correlation with temperature.

In another aspect, the present invention provides a method for fabricating a temperature compensated fiber Bragg grating package. The method comprises laterally introducing an optical fiber into a channel of a member so that the Bragg grating of the fiber is between a first end of the member and a second of the member. Member has a negative thermal coefficient of expansion. The fiber is tensioned within the channel, and affixed to the member adjacent to the first end, and adjacent to the second end, while the fiber is exposed laterally from within the channel.

DETAILED DESCRIPTION OF THE SPECIFIC EMBODIMENTS

Figure 1A:
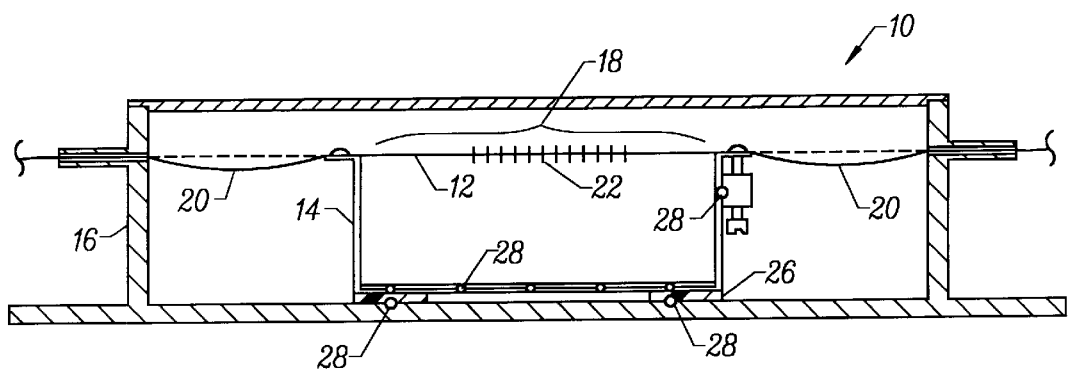
FIG. 1A is a cross-sectional view of a temperature compensated fiber Bragg grating package in which a resilient compensator structure tensions the optical fiber, in which the compensator and grating are disposed within a casing, according to the principles of the present invention.

Referring now to FIG. 1A, a temperature compensated optical fiber package 10 generally includes an optical fiber 12 supported by a compensator 14 within a casing 16.

Optical fiber 12 is separated into three portions within casing 16: a tensioned portion 18 which is under a tension load imposed by compensator 14, and two loose portions 20 disposed between tensioned portion 18 and the surrounding casing 16. Tensioned portion 18 includes a Bragg grating 22 (shown schematically).

Figure 1B:
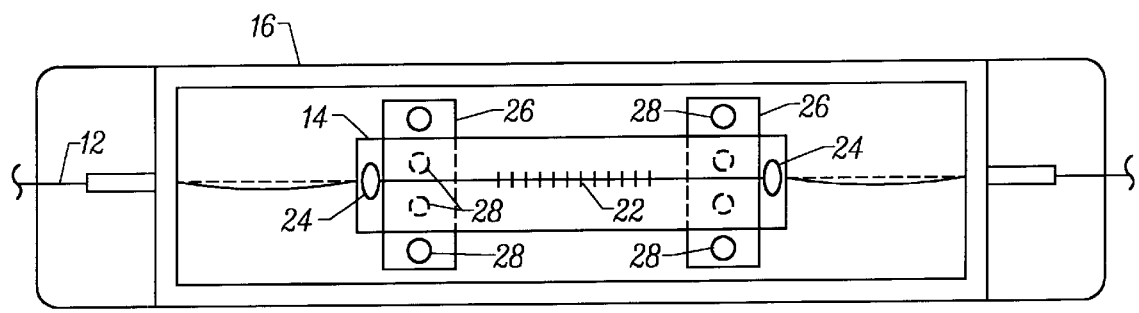
FIG. 1B is a top view of the package of FIG. 1A, in which the top of the casing has been removed to show the compensator and optical fiber therein.

As can be understood with reference to the top view shown in FIG. 1B the fiber is affixed to compensator 14 by hard epoxy 24. Compensator 14 is held within casing 16 on two plates 26. Welds 28 affix the plates 26 to the casing 16. It should be noted that compensator 14 is affixed to only one of the plates by additional welds 28, so that the other end of the compensator is free to deflect upward away from the other plate. Welds 28 may generally be formed by laser welding, spot welding, soldering, or the like. Alternatively, the components of package 10 may be attached to each other using fasteners, adhesive, or the like. However, where lateral deflection of a resilient compensator is used to vary the tension in fiber 12, the compensator will preferably be affixed within a surrounding casing along only a portion of the axial length of the compensator, compensator 14 ideally being affixed to case 16 at substantially a single axial point, as can be understood with reference to FIGS. 1A and 1B.

Figure 2A:
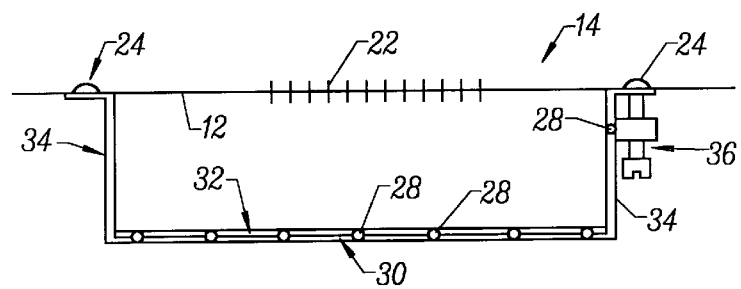
FIGS. 2A and 2B are side and top views, respectively, of the compensator of FIG. 1, showing the attachment between the resilient members to effect the lateral displacement of the compensator with changes in temperature, and also showing the lateral arms which amplify the variation in fiber tension caused by the lateral deflection.
Figure 2B:
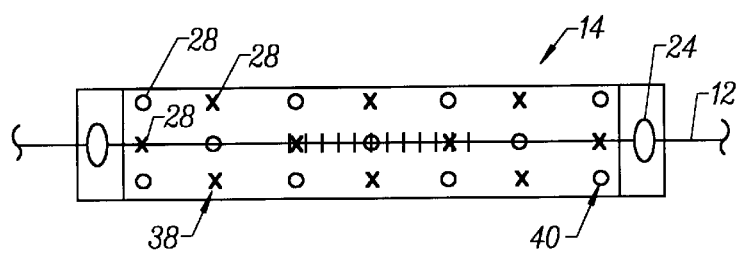

The operation of compensator 14 can be understood with reference to FIGS. 2A and 2B. Compensator 14 is generally illustrated without visible deflection of its structural components for simplicity.

As described above, compensator 14 supports fiber 12 under tension. Compensator 14 generally comprises a first deflectable member 30 affixed along a second deflectable member 32. A pair of arms 34 extend laterally from the ends of the deflectable members, and the optical fiber 12 is affixed to arms 34 by hard epoxy 24. An adjustment mechanism 36 is affixed to one arm 34 by a weld 28, and welds 28 also affix the first and second deflectable members 30, 32 together. More specifically, laser welds between first deflectable member 30 and second deflectable member 32 form an alternating pattern, in which roughly half the welds are formed by laser welding from the side of first deflectable member 30 (as indicated by symbol 38), and in which the alternate welds are formed by laser welding from the direction of the second deflectable member 32 (as indicated by alternate symbol 40). This alternating pattern avoids uneven thermal expansion of the deflectable members. A variety of alternative attachment mechanisms might also be used, including soldering, rivets or other fasteners, adhesive bonding, roll-seam welding, and the like.

In the exemplary embodiment, adjustment mechanism 36 comprises a nut affixed to arm 34 and a screw which engages the arm adjacent to fiber 12. Varying the rotational position of the screw deflects arm 34 and also changes the effective stiffness of the arm. Hence, adjustment mechanism 36 facilitates tuning of the tension induced in fiber 12, improving the performance of compensator 14 to achieve a near zero effective thermal coefficient for the packaged fiber Bragg grating.

Case 16 will typically comprise a relatively low cost metal having good soldering and/or welding characteristics, such as brass, stainless steel, or the like. As fiber 12 includes loose portions 20 on either side of tensed portion 18, thermal expansion and/or contraction of case 16 will have no effect on the tension of fiber Bragg grating 22. Additionally, loose portions 20 allow compensator 14 to move within case 16 about its single attachment point, thereby allowing compensator 14 to deflect with varying temperatures to alter the tension in the fiber Bragg grating without interference from the surrounding casing.

First deflectable member 30 of compensator 14 will generally have a higher coefficient of thermal expansion than second deflectable member 32. This causes the ends of the members to bow upward to compensate for increasing temperatures by decreasing the tension in fiber Bragg grating 22. Clearly, where compensator 14 is instead intended to increase the variation in wavelength with variations in temperature, these relative coefficients of thermal expansion can be reversed. First and second deflectable members 30, 32 will generally be flexible members which deflect resiliently, typically comprising metals. In the exemplary embodiment, first deflectable member 30 comprises a stainless steel plate, and second deflectable member 32 comprises a Kovar™ plate. Arms 34 may extend from one of the first and second deflectable members 30, 32, or may instead comprise structures which are formed separately and affixed to at least one of the first and second deflectable members. This latter structure, while somewhat more complex, allows the structural characteristics of arms 34 to be varied independently from the material and stiffnesses of the deflectable members.

As first and second deflectable members 30, 32 have differing coefficients of thermal expansion, and as these two structures are affixed together along their lengths, they will expand and contract linearly at different rates during changes in temperature. When the temperature increases from a first temperature to a second temperature, the lengths of both deflectable members will increase. This increase in length will have some effect on the tension in optical fiber 12. Additionally, first deflectable member 30 will increase in length more than second deflectable member 32, due to the higher coefficient of thermal expansion of the first deflectable member. As these structures are resiliently deflectable and affixed together, this difference in length will cause the ends of the deflectable members to curve laterally relative to an axis through the ends of the beams, the ends of the beams specifically curving laterally toward optical fiber 12. This curvature of the deflectable members will also have an effect of the tension in fiber 12, and arms 34 amplify the effects of this curvature and the resulting variations in fiber tension. Finally, the tension in fiber 12 will often resiliently deflect arms 34 inward, both before and after the increase in temperature, with the deflection in the arms decreasing as tension in the fiber decreases. In our exemplary embodiment, the goal of these interacting deflections is to compensate for the variations in a fiber Bragg grating during changes in temperature.

The wavelength λ of a fiber grating can be expressed as λ=2nΛ, in which n is the index of refraction and Λ is the periodic spacing of the grating structure. From this, we can derive the unified shift in wavelength due to a change in temperature as:

$$d\frac{\lambda}{\lambda dT} = \frac{d\Lambda}{\Lambda dT} + \frac{dn}{ndT} = \alpha_f + \frac{dn}{ndT}.$$

This tells us that the coefficient of thermal expansion for the fiber core, $\alpha_f$, plus the temperature coefficient for the refractive index will give us the shift in wavelength. Using the relevant values for fused quartz, we get:

$$\frac{d\lambda}{\lambda dT} \approx 6 \times 10^{-6} K^{-1}$$

We also know that the wavelength of a fiber grating can be changed by stretching or compressing the grating axially. As $$\frac{d\lambda}{\lambda dT}$$

is a positive value, and as fiber is difficult to compress, it is much easier to compensate for temperature for prestretching the fiber grating so that the fiber remains under tension even at low temperatures, and gradually decreasing the tension in the fiber as the temperature rises. In other words, where 1 is a length of the fiber, we get:

$$-\frac{dl}{ldT} = \frac{d\lambda}{\lambda dT} \approx 6 \times 10^{-6} K^{-1}.$$

Figure 3:
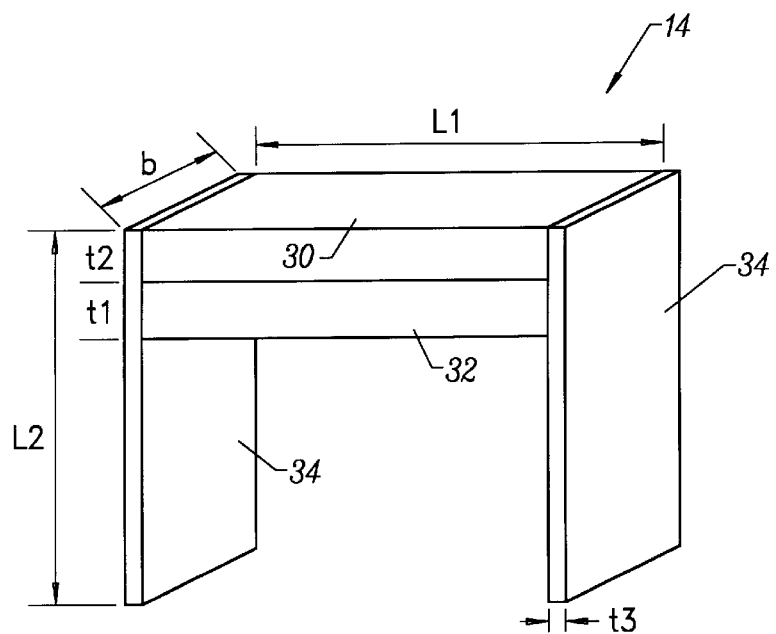
FIG. 3 illustrates the dimensions of the compensator of FIG. 1, which can be varied to control the correlation between temperature and tension in the optical fiber.

In analyzing compensator 14, we will generally make use of the dimensions illustrated in FIG. 3. $L_1$ is the length of the first and second deflectable members 30, 32, and $L_2$ is the length of arms 34. Second deflectable member 32 has a thickness of t1, while first deflectable member 30 has a thickness of t2. Arms 34 each have thicknesses of t3, while the entire device is assumed to have an overall width of b. It should be understood that similar calculations could be made for a wide variety of different structures, such as those having arms of differing widths, first and second structures of differing lengths, and the like. Tension will be imposed on the fiber based on the relative position of arms 34 opposite the first and second deflectable members 30, 32.

Figure 4:
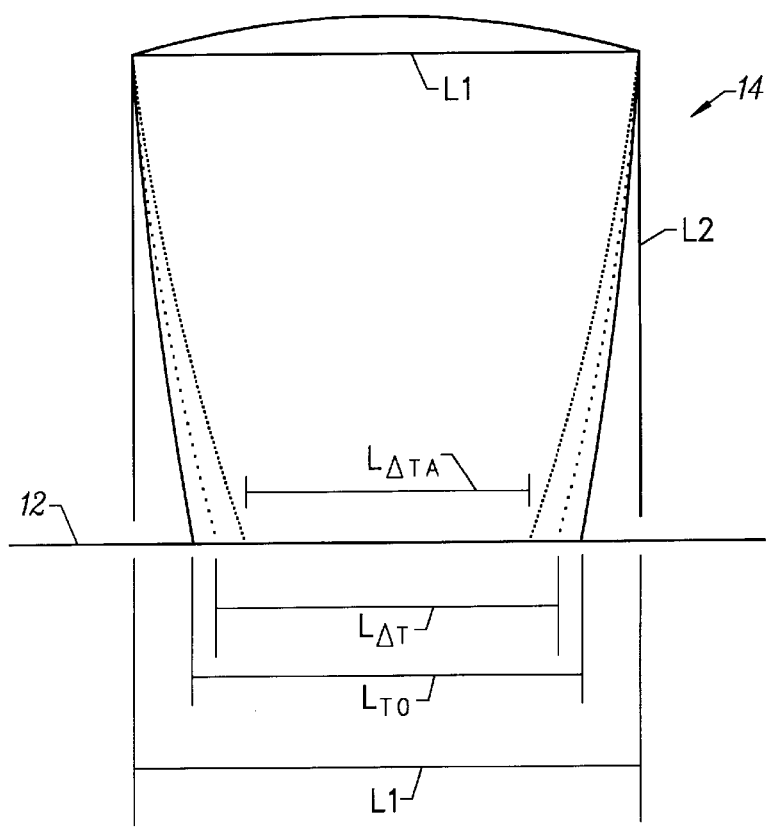
FIG. 4 schematically illustrates some of the components of the tension applied to the fiber by the compensator within the package of FIG. 1.

As described above, tension in the optical fiber will be a result of at least three different mechanisms. The first is the thermal expansion of the materials of the first and second deflectable members 30, 32. The second tension inducing mechanism is the stress deformation of the first and second deflectable members caused by differential thermal expansion. The third tensioning mechanism is the elastic bending of the two arms 34 extending from the deflectable mechanisms to the optical fiber. As schematically illustrated in FIG. 4, compensator 14 is assumed to have a length $L_1$ between arms 34 adjacent fiber 12 when the compensator is at rest. At an initial temperature of $t_0$ optical fiber 12 is mounted on arms 34 so that the arms impose a tension on tensioned portion 18. In turn, the optical fiber deflects arms 34 inward, so that the length of the tensioned portion of the fiber at $t_0$ is $L_{t0}$. When the temperature increases by Δt, resilient deflection of the first and second deflectable members would result in a length of the tensed portion 18 of $L_{\Delta tA}$ if only thermal bending of the structures is considered. However, if we also take the decreased deflection of the arms 34 into account, we find that the actual length of tensed portion 18 after the increase in temperature is $L_{\Delta t}$.

First analyzing the thermal bending of the first and second deflectable members, we set $\alpha_1$ as the linear thermal coefficient of expansion for the second deflectable member, and $E_1$ as its corresponding modulus of elasticity. The first deflectable member has a linear thermal coefficient of expansion of $\alpha_2$, and a modulus of elasticity of $E_2$. Arms 34 have linear thermal coefficients of expansion and modulus of elasticity of $\alpha_3$ and $E_3$, respectively. The optical fiber has a modulus of elasticity of $E_f$ and a cross-sectional area of A.

Figure 6:
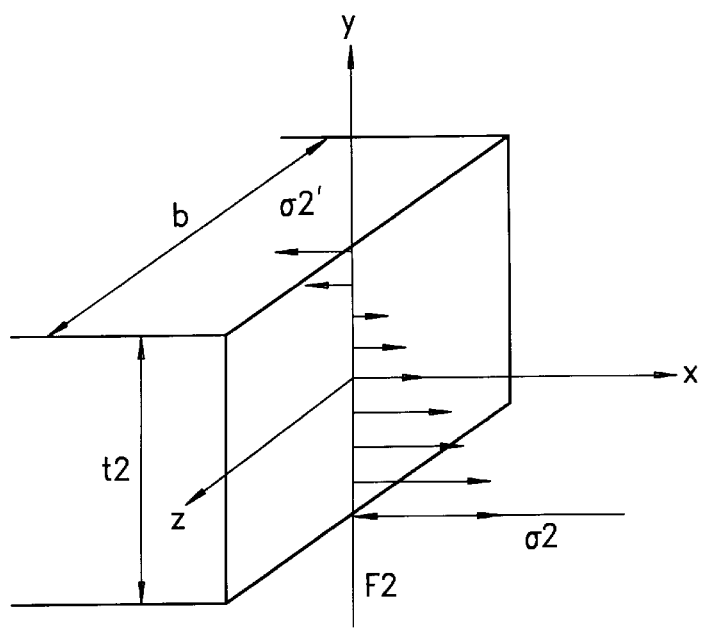
FIG. 6 illustrates the stresses within one of the deflectable members of the compensator.

We will first analyze the internal stress distribution within the deflectable members (which here act as resiliently deflectable beams) to understand the bending moments within the combined structure. Reviewing the stress distribution within the first deflectable member as illustrated in FIG. 6, the second deflectable member acts on this structure with a total force of F2. To bring this force into equilibrium, stress in the material of the first member near the joint between the two deflectable members is $\sigma_2$. The stress at the opposite side of the first deflectable member is $\sigma_2'$, and stress can be expressed as:

$$\sigma(y) = \frac{\sigma_2 - \sigma_2'}{t_2} y + \frac{\sigma_2 + \sigma_2'}{2}$$

The total internal force within the second deflectable member $$\int_{t_2/2}^{-t_2/2} \sigma(y) bd\, y = \frac{1}{2}(\sigma_2 + \sigma_2') b t_2$$

The bending moment about the z axis (here centered within first deflectable member 30) is:

$$\int_{t_2/2}^{-t_2/2} \sigma(y) bd\, y = \frac{\sigma_2 - \sigma_2'}{t_2} \cdot \frac{b t_2^3}{12}$$

As the system is in equilibrium, we know that:

$$\frac{1}{2}(\sigma_2 + \sigma_2') b t_2 = F2 \quad \text{and}$$

$$\frac{\sigma_2 - \sigma_2'}{t_2} \cdot \frac{b t_2^3}{12} = F2 \cdot \frac{t_2}{2} \quad \text{so that}$$

$$\sigma_2' = \frac{1}{2}\alpha_2. \quad \text{and} \quad \sigma_1' = \frac{1}{2}\alpha_1.$$

As we know that the second deflectable member acts on the first deflectable member with the same force that the first deflectable acts on the second deflectable member, we also know that:

$$\sigma_2 t_2 = \sigma_1 t_1.$$

Figure 5:
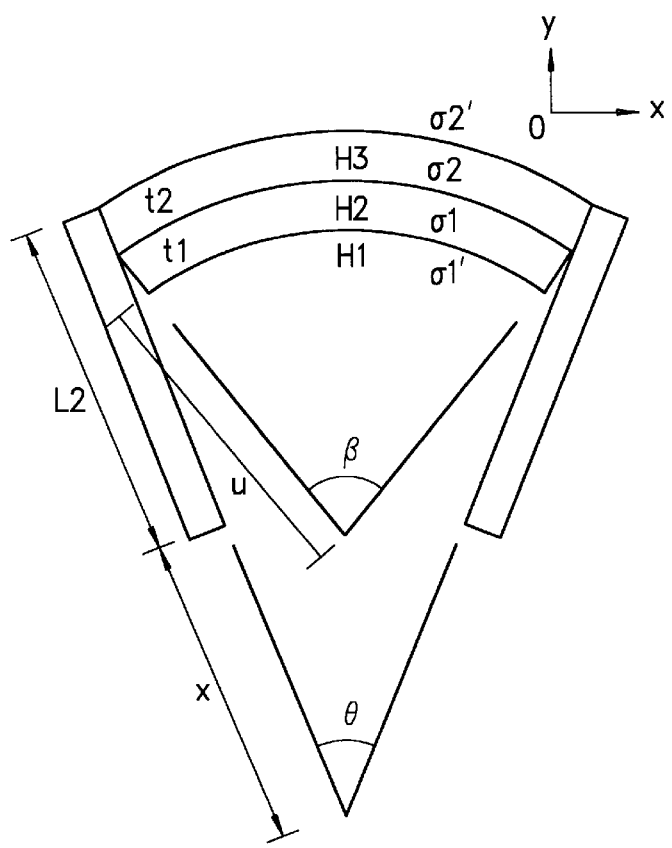
FIG. 5 schematically illustrates the temperature-induced deflection of the compensator of the package of FIG. 1.

Using the dimensions illustrated in FIG. 5, we can write that:

$$H_2 = L_1 + \alpha_1 L_1 dT + L_1 \frac{\sigma_2}{E_1}$$
$$= L_1 + \alpha_2 L_1 dT - L_1 \frac{\sigma_2}{E_2}$$
$$= \theta(x + L_2 - t_2)$$

and

-continued
$$H_3 = L_1 + \alpha_2 L_1 dT - L_1 \frac{\sigma_2}{E_2} = \theta(x + L_2)$$

Reorganizing these equations, we get:

$$\Delta \alpha dT = \frac{\sigma_1}{E_1} + \frac{\sigma_2}{E-2} \quad \text{so that} \quad \sigma_2 = \frac{\Delta \alpha dT E_1 E_2 t_1}{t_1 E_1 + t_2 E_2},$$

$$\theta = \frac{L_1}{t_2} \cdot \frac{3\sigma_2}{2E_2}, \quad \text{and} \quad x = -L_2 + \frac{2E_2 t_2}{3\sigma_2}\left(1 + \alpha_2 dT + \frac{\alpha_2}{2E_2}\right)$$

Neglecting higher order quantities, we therefore have that the contraction of the fiber due to thermal bending of the first and second deflectable members is:

$$\Delta L = L_1 - \theta x = \frac{3L_1 L_2 - L_1 t_2}{2 t_2} - L_1 \alpha_2 dT$$

Once again, this change in length $\Delta L$ corresponds to the effects of the thermal bending of the first and second deflectable members.

Next analyzing the deformation of the fiber supports and the elasticity of the fiber itself, the tension on the fiber F is given by the following equation:

$$F = \frac{\Delta L' A E_f}{L_1}$$

The deformation of one of the two supports will be equal to $\Delta L'' + -F/K$, where K is the elasticity constant of arm 34. Analyzing arm 34 as a small beam, we can calculate K as:

$$K = \frac{E_3 b t_3^3}{4 L_2^3}.$$

Making use of the geometrical relationships illustrated in FIG. 5, we have that:

$$\Delta L + 2\Delta(\Delta L'') = \Delta(\Delta L'), \quad \text{where}$$

$$\Delta(\Delta L'') = -\Delta F / K = \frac{-\Delta(\Delta L') A E B_f}{K L_1}$$

in which $\Delta L'$ is the change in length of tense portion 18 due to the elasticity of the fiber and in which $\Delta L''$ is the change in length of the fiber due to the resilient deflection of arm 34. From these relationships, we calculate the total change in length of the optical fiber as $$\Delta(\Delta L') = \frac{L_1 \Delta L}{L_1 + \frac{2 A E_f}{k}}$$

Substituting for $\Delta L$ and dividing by L and dT, we have that:

$$\frac{\Delta(\Delta L')}{L_1 dT} = \frac{\frac{1}{2 A E_f}}{1 + K L_1}\left(\frac{3L - 2 - t_2}{2 t_2} \cdot \frac{\Delta \alpha E_1 t_1}{E_1 t_1 + E_2 t_2} - \alpha_2\right)$$

For a compensator 14 which adjusts the tension in the optical fiber to compensate for the temperature induced variation in the wavelength of a fiber Bragg grating, we want the following relationship:

$$\frac{\Delta(\Delta L')}{L_1 dT} = \alpha_f + \frac{dn}{n dT}$$

As an example of typical dimensions for compensator 14, in which first deflectable member 30 is formed of stainless steel and the second deflectable member 32 is formed of Kovar™, together with a standard optical fiber having a fiber Bragg grating, our materials have the following properties:

| | | |
|---|---|---|
| Kovar | $\alpha_1 = 4.81 \times 10^{-6} K^{-1}$ | $E_1 = 14.1$ GPa |
| Stainless steel | $\alpha_2 = 18.0 \times 10^{-6} K^{-1}$ | $E_2 = 210$ GPa |
| Fiber | $\alpha_f = 0.54 \times 10^{-6} K^{-1}$ | $E_f = 74$ GPa |
| | $A = 0.01227$ mm$^2$ | |

Using typical dimensions for our compensator 14, as illustrated in FIGS. 3 and 5:

$L_1 = 21$ mm $\quad L_2 = 7$ mm $b_1 = b_2 = 5$ mm $\quad t_1 = t_2 = 0.26$ mm

And substituting this into the above formula, we calculate that the change in length due to thermal bending of our deflectable members is:

$$\frac{\Delta L}{L_1 dT} = 15.1 \times 10^{-6} K - 1$$

To provide our desired compensator performance of:

$$\frac{\Delta(\Delta L')}{L_1 dT} = \alpha_f + \frac{dn}{n dT} = 6 \times 10^{-6} K^{-1}$$

We calculate that:

$K = 5.7 \times 10^4$ (Newton/Meter)

Therefore, the design parameters provide a sufficient number of degrees of freedom to produce the desired compensation. To allow each package to be tuned throughout that range, and to improve the quality and performance of real-world compensator packages, adjustment mechanism 36 (illustrated in FIG. 2A) can be provided on mass-produced compensator packages.

From the above analysis, we see that the length $L_2$ of arms 34 variably amplify the effects of thermal bending on tension in the fiber. Hence, the arms facilitate the fabrication of compensators which accurately adjust the tension in the optical fiber to compensate for temperature induced variations in wavelengths. It may also be possible to produce a compensator in which the optical fiber is attached directly to the deflectable members using hard epoxy or the like. Where the tensioned portion 18 of optical fiber 12 is directly bonded to the two ends of the deflectable members (in other words, when $L_2$ is equal to 0), the following equations describe the effects of an increase in temperature of dT:

$$\Delta \alpha dT = \frac{\sigma_1}{E_1} + \frac{\sigma_2}{E_2}$$

$\sigma_1 t_1 b_1 = \sigma_2 t_2 b_2$ $\sigma_1 = -2\sigma'_1$ $$\beta(u + t_1) = L_1 + \alpha_1 L_1 dT + L_1 \frac{\sigma_1}{E_1}$$

$$\beta u = L_1 + \alpha_1 L_1 dT + L_1 \frac{\sigma'_1}{E_1}$$

The length of the tensioned portion of the fiber after the change in temperature is:

$$L'_1 = 2u \sin\left(\frac{\beta}{2}\right) \approx \beta u - \frac{1}{4} u \beta^2$$

And the change in length due to that change in temperature is:

$\Delta L = L_1 - L'_1$ $$= -\alpha_1 L_1 dT + \left(\frac{L_1}{2} + \frac{3}{8}\frac{L_1^2}{t_1} + \frac{3}{8}\frac{\alpha_1 L_1^2 dT}{t_1}\right)\frac{\sigma_1}{E_1} - \frac{3}{16}\frac{L_1^2}{t_1}\frac{\sigma}{E}$$

Again neglecting the second order terms for thermal expansion, our analysis tells us that:

$$\frac{\Delta L}{L_1 dT} = \left(\frac{1}{2} + \frac{3}{8}\frac{L_1}{t_1}\right)\frac{\Delta \alpha E_2 b_2 t_2}{E_2 b_2 t_2 + E_1 b_1 t_1} - \alpha_1$$

So that a fully compensated fiber package will fulfill the following equation:

$$\frac{\Delta L}{L_1 dT} = \alpha_f + \frac{dn}{n dT} \approx 6 \times 10^{-6} K^{-1}$$

Such a compensator structure can be fabricated using the Kovar™ and stainless steel materials having the properties listed above.

Figure 7:
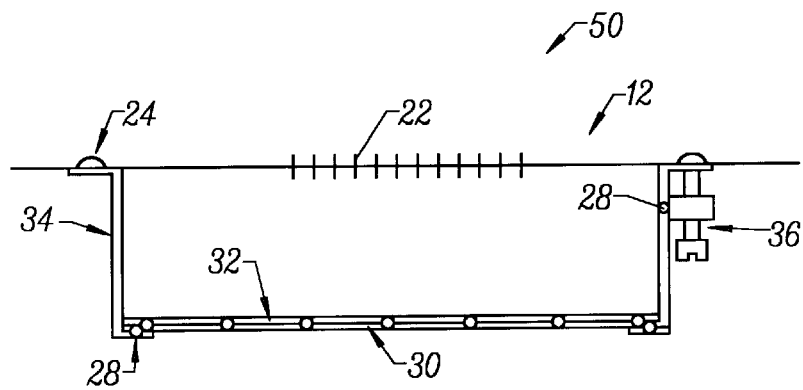
FIG. 7 illustrates an alternative compensator structure, in which the arms which extend between the deflection members and the fiber are formed separately and attached to the deflection members.

Referring now to FIG. 7, an alternative compensator 50 includes many of the structures described above, but has arms 34 which are welded to first deflectable member 30. A wide variety of alternative variations are also possible, including compensators which make use of a single set of deflectable members to compensate for temperature variations in a plurality of optical fibers. In some embodiments, the optical fibers may be aligned substantially parallel to each other extending between a single set of arms 34. In fact, such a structure may be provided by simply affixing at least one additional optical fiber 12 alongside and parallel to the optical fiber shown in FIG. 7. Alternatively, each optical fiber may be mounted on an independent arm 34 on at least one end, with each arm having its own adjustment mechanism 36 to allow the compensator to be tuned individually for each optical fiber.

As described briefly above, force transferred to the fiber from the surrounding case may interfere with accurate compensation of the temperature induced variations in wavelength. As compensator 14 will be disposed in a cavity of case 16 which is about 45 mm in length, 14 mm high, and 14 mm wide, and as the compensator structure will typically be around 20 mm in length ($L_1$ equal to approximately 20 mm) the loose portions 20 of optical fiber 12 on either side of tensioned portion 18 will each be roughly 13 mm long. Assuming our case material is brass having a thermal coefficient of expansion $\alpha_c=20 \times 10^{-6}$, we can calculate the minimum amount of excess optical fiber material which should be provided at each loose portion to avoid any transmission of tension from the surrounding case to tensioned portion 18 (see FIG. 1A). Assuming our full working range is 100 degrees centigrade, and knowing the total change in length which will occur throughout this range for tensioned portion 18 from our compensator design calculations, our total package will typically contain more than about 1 mm of excess optical fiber length beyond that required to span directly through casing 16. This may easily be provided by displacing each of each of the loose portions 20 by at least 0.43 mm prior to soldering the optical fiber to the surrounding casing.

Figure 8A:
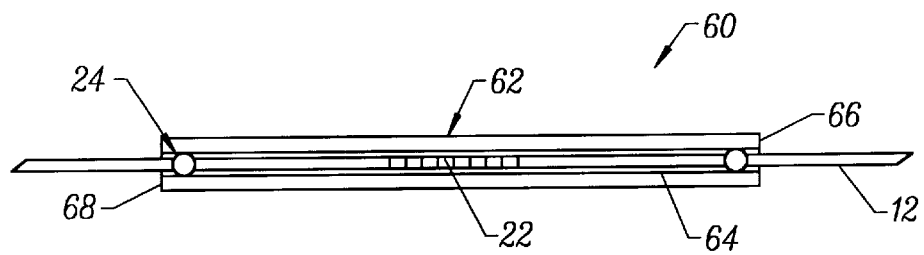
FIGS. 8A–8D illustrate a simple fiber Bragg grating compensation package in which the fiber is laterally exposed within a channel of a member to facilitate fabrication of the package, according to the principles of the present invention.
Figure 8B:
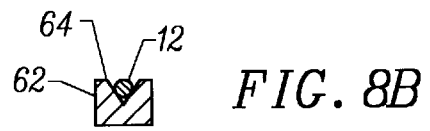
Figure 8C:
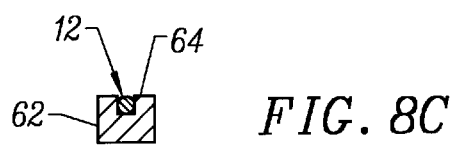
Figure 8D:
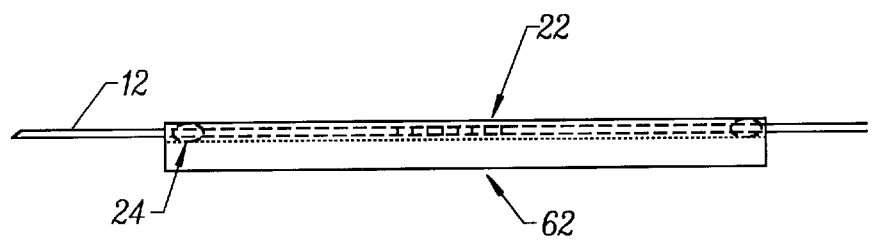
Figure 9:
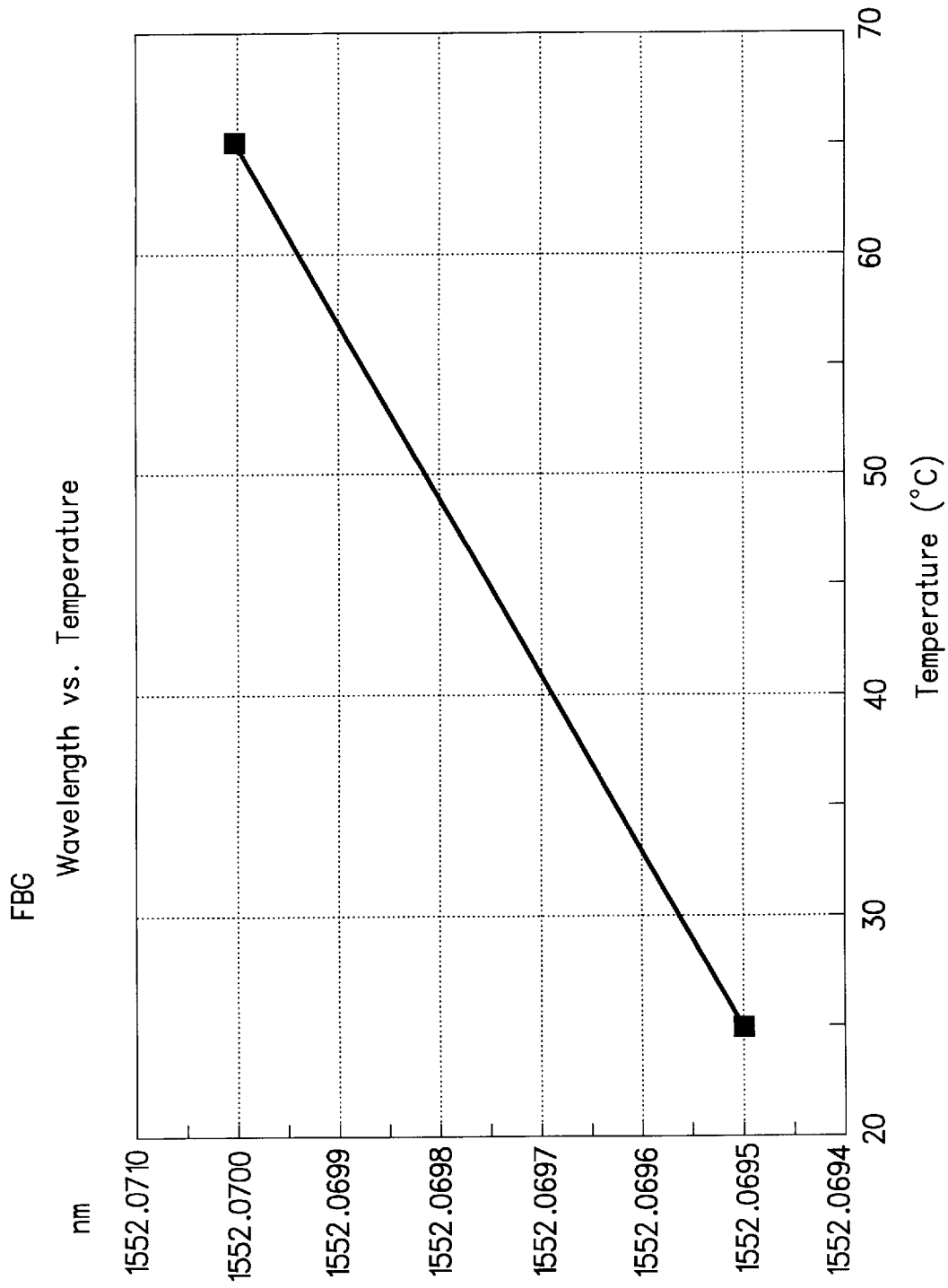
FIGS. 9 and 10 are graphs illustrating the variations of wavelength versus temperature for uncompensated fiber Bragg gratings, and for fiber Bragg gratings packaged within the temperature compensation packages of the present invention.
Figure 10:
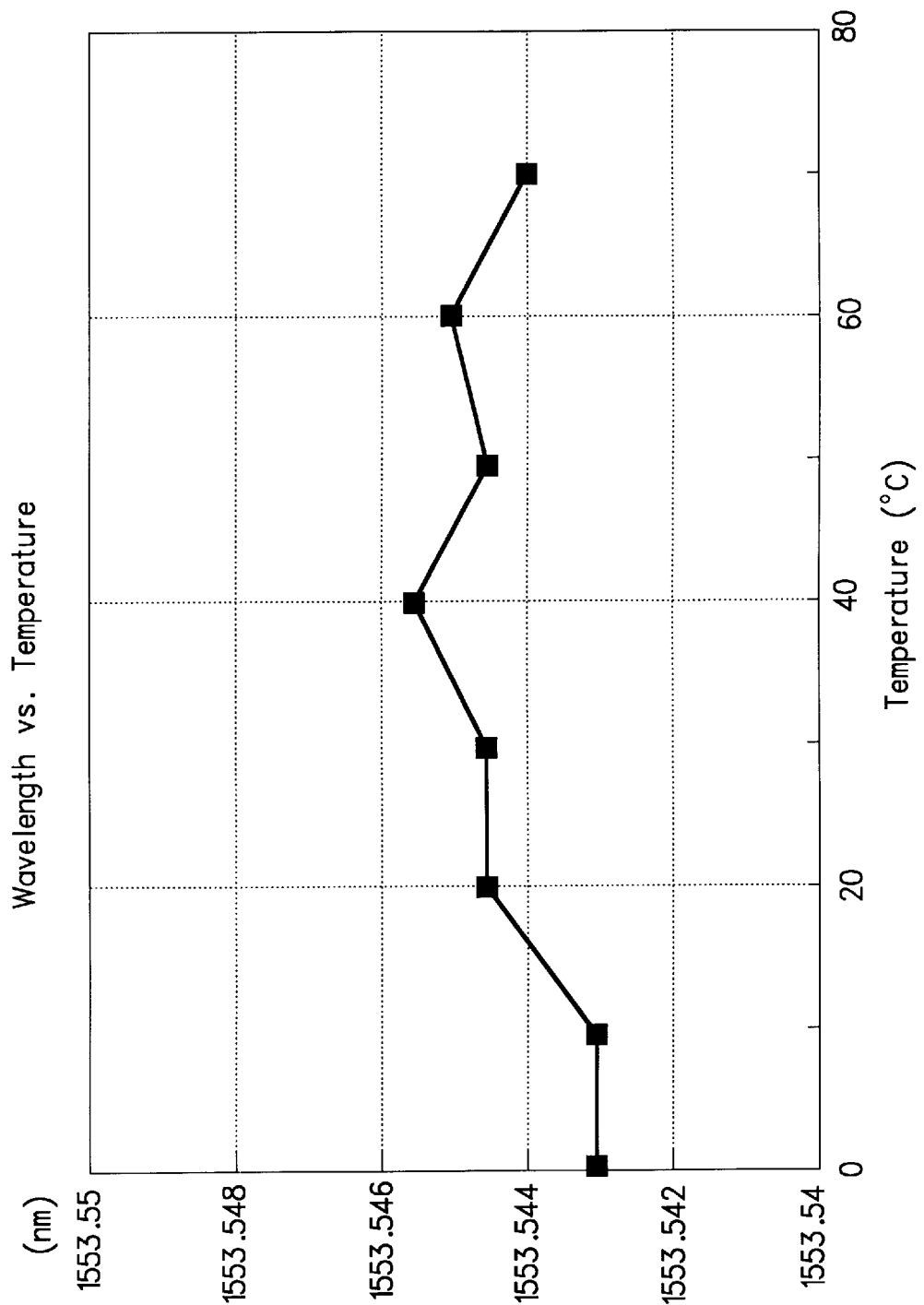

An alternative optical fiber compensation package 60 makes use of a simple rod 62 having a channel 64. Rod 62 has first and second ends 66, 68 and roughly defines an axis parallel to optical fiber 12. Channel 64 may optionally have a V-shaped cross-section as illustrated in FIG. 8B, a U-shaped cross-section as illustrated in FIG. 8C, or the like, and will generally be open laterally. The open channel greatly facilitates insertion and tensioning of the optical fiber, and affixing the position of the tensioned optical fiber 12 within channel 64 of rod 62 using hard epoxy 24.

Rod 62 generally comprises a material having thermal expansion properties which compensate for the temperature induced variations in the wavelength of Bragg grating 22, so that simply pre-tensing fiber 12 and affixing the fiber within channel 64 adjacent first and second ends 66, 68 with hard epoxy 24 will provide a substantially compensated fiber Bragg grating package. Open channel 64 also greatly eases the process of epoxying optical fiber 12 to rod 62. An exemplary rod material is commercially available from Nippon Electric Glass Company, limited of Osaka, Japan, under the name Neoceram™ N-O.

Hard epoxy 24 generally comprises a standard epoxy material mixed with a powder having a negative coefficient of thermal expansion or low coefficient of thermal expansion. The powder increases the strength and hardness of the epoxy, and enhances the bond by decreasing differential thermal expansion between the epoxy and rod 62, fiber 12, or other structures. Exemplary powder material having negative coefficients of thermal expansion include Neoceram™ powder, also available from Nippon Electric Glass Company, or Zirconium Tungstate, which is commercially available from Teledyne Wah Chang Albang of Allany, Oreg. Exemplary powder materials having low coefficients of thermal expansion include Neoceram™ N-11 powder, once again available from Nippon Electric Glass Company, or quartz glass powder.

While the exemplary embodiments have been described in some detail, by way of illustration and for clarity of understanding, a variety of modifications, changes, and alternatives will be obvious to those who skill in the art. For example, differential thermal expansion of a rigid structure relative to a resiliently deflectable structure could induce a thermal bending in the resilient structure only by coupling the two members at their ends, rather than bending both structures together. Hence, the scope of the present invention is limited solely by the attached claims.

What is claimed is:

1. A temperature-adjusting optical fiber package comprising:

a first member having a first end and a second end and defining an axis therebetween, the first member having a first thermal coefficient of expansion;

a second member having a second thermal coefficient of expansion which is different than the first coefficient, the second member affixed axially along the first member to impose a resilient lateral deflection in the first member which varies with temperature; and an optical fiber portion with a first end and a second end, the fiber between the first and second portion ends having an optical characteristic which varies with tension, wherein the fiber is substantially axially oriented; and at least one arm extending laterally from the first member to the optical fiber so as to amplify changes in the tension of the optical fiber from changes in the deflection, the at least one arm including a first arm extending from adjacent the first end of first member to the first portion end, the second fiber end coupled to the first member adjacent the second end of the first member so that the fiber between the first and second portion ends defines an unsupported span, wherein the affixed first and second members impose a tension in the unsupported span of the fiber which varies with the resilient deflection of the first and second members.

2. A package as claimed in claim 1, further comprising a mechanism coupled to at least one of the first member and the at least one arm for adjusting the changes in the tension of the fiber.

3. A temperature-adjusting optical fiber package comprising:

a first member defining an axis and having a first thermal coefficient of expansion;

a second member having a second thermal coefficient of expansion which is different than the first coefficient, the second member axially affixed along the first member to impose a resilient lateral deflection in the first member which varies with temperature; and an optical fiber having an optical characteristic which varies with tension, the fiber substantially axially oriented, the first member supporting the fiber under a tension which varies with the resilient deflection of the first member;

at least one arm extending laterally from the first member to the optical fiber so as to amplify changes in the tension of the optical fiber from changes in the deflection, wherein the at least one arm is resiliently deflected by the tensioned optical fiber.

4. A temperature-compensated optical fiber package comprising:

a first member having a first thermal coefficient of expansion, a first end, a second end, and an axis between the first end and the second end;

a second member affixed axially along the first member, the second member having a second thermal coefficient of expansion which is different than the first coefficient so that a resilient lateral deflection of the first and second members varies in response to a temperature of the package;

an optical fiber portion having first and second portion ends and an optical characteristic which varies with temperature and with tension between the first and second portion ends, the first and second portion ends of the fiber attached to the first and second ends of the first member by first and second attachment structures, respectively, so that the fiber portion defines a span separated from the first and second members between the first and second portion ends, the attachment structures imposing a tension on the fiber which varies in response to the lateral deflection of the first and second members so that the tension compensates for temperature-induced variations in the optical characteristic.

5. A package as claimed in claim 4, wherein the attachment structures comprise arms which extend laterally from the members to the fiber, an axial displacement of the arms adjacent the fibers being greater than an axial displacement of the arms adjacent the members.

6. A package as claimed in claim 4, wherein the attachment structures resiliently support the fiber relative to the members.

7. A package as claimed in claim 4, wherein the attachment structures comprise an epoxy and at least one of a low thermal expansion material and a negative thermal expansion material to enhance the hardness of the epoxy.

8. A package as claimed in claim 4, wherein the second member is affixed to the second member by solder or a laser weld.

9. A package as claimed in claim 4, further comprising a housing containing the first and second members and at least a portion of the fiber.

10. A package as claimed in claim 9, wherein the members are affixed to the housing along an axial portion of the first member which is less than an axial length of the first member.

11. A package as claimed in claim 4, further comprising a plurality of fibers affixed to the attachment structures.

12. A package as claimed in claim 4, wherein the optical fiber comprises:

a Bragg grating, the Bragg grating having a resonant frequency which varies with temperature when the fiber is at rest, the fiber coupled to the members so that the members impose a varying tension in the fiber while a temperature of the package changes within a range of between about −20 and 80° C., the varying tension tailored throughout the temperature range to compensate for temperature-induced resonant frequency variation of the Bragg grating so that a variation of the resonant frequency of the Bragg grating within the package remains less than 0.001 nm.

13. A temperature-compensated optical fiber package comprising:

a first member having a first thermal coefficient of expansion, a first end, a second end, and an axis between the first end and the second end;

a second member affixed axially along the first member, the second member having a second thermal coefficient of expansion which is different than the first coefficient so that a resilient lateral deflection of the first and second members varies in response to a temperature of the package;

an optical fiber having and an optical characteristic which varies with temperature and with tension, the fiber attached to the first and second ends of the first member by first and second attachment structures, respectively, the attachment structures imposing a tension on the fiber which varies in response to the lateral deflection of the first and second members so that the tension compensates for temperature-induced variations in the optical characteristic; and a housing containing the first and second members and at least a portion of the fiber, wherein the fiber comprises two untensioned portions disposed between the attachment structures and a surrounding housing wall, the untensioned portions having lengths sufficiently greater than a distance between the attachment structures and the surrounding housing wall to inhibit force transfer from the housing to the attachment structures when the housing varies in size with temperature.

* * * * *